US012084831B2

(12) United States Patent
Rudolf et al.

(10) Patent No.: US 12,084,831 B2
(45) Date of Patent: Sep. 10, 2024

(54) POWERTRAIN ARRANGEMENT OF A WORK MACHINE AND A WORK MACHINE

(71) Applicant: ZF FRIEDRICHSHAFEN AG, Friedrichshafen (DE)

(72) Inventors: Alexey Rudolf, Markdorf (DE); Michael Siber, Schwenningen (DE); Rico Glöckner, Pocking (DE); Xiaoting Zhu, Friedrichshafen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 18/687,315

(22) PCT Filed: Aug. 30, 2022

(86) PCT No.: PCT/EP2022/074023
§ 371 (c)(1),
(2) Date: Feb. 28, 2024

(87) PCT Pub. No.: WO2023/031159
PCT Pub. Date: Mar. 9, 2023

(65) Prior Publication Data
US 2024/0271386 A1    Aug. 15, 2024

(30) Foreign Application Priority Data
Aug. 30, 2021   (DE) .................. 10 2021 209 464.3

(51) Int. Cl.
*B60K 1/02*     (2006.01)
*B60K 17/22*    (2006.01)
(Continued)

(52) U.S. Cl.
CPC .............. *E02F 9/0866* (2013.01); *B60K 1/02* (2013.01); *B60K 17/22* (2013.01); *B60K 17/28* (2013.01);
(Continued)

(58) Field of Classification Search
CPC ........ E02F 9/0866; E02F 9/0841; B60K 1/02; B60K 17/22; B60K 17/28; B60K 6/405;
(Continued)

(56) References Cited

U.S. PATENT DOCUMENTS 6,491,123 B1   12/2002  Pasquini et al.
7,979,188 B2 *  7/2011  Burkhart ................ B60K 23/08
                                                   180/245
(Continued)

FOREIGN PATENT DOCUMENTS

DE          60032959 T2    11/2007
DE       202014000738 U1    3/2014
(Continued)

*Primary Examiner* — Steve Clemmons
(74) *Attorney, Agent, or Firm* — LEYDIG, VOIT & MAYER, LTD.

(57) ABSTRACT

A powertrain arrangement of a working machine, including a first and second electric motor, frame component, and transmission, the first and second electric motor being connected to the transmission for transmitting torque. The frame component forms a receiving space, in which the first and second electric motor and the transmission are accommodated. The frame component has a rear axle casing section configured to rotatably bear a universal-joint shaft connecting the transmission to a rear axle. The frame component has a top-side frame section, which is arranged adjacent to a cab floor in a vertical direction. The first and second electric motor are arranged next to each other in a transverse direction and at least partially at a same level in the vertical direction. The first and second electric motor are arranged above the rear axle casing section and below the top-side frame section in the vertical direction.

13 Claims, 3 Drawing Sheets

(51) Int. Cl.
  *B60K 17/28* (2006.01)
  *B60L 15/00* (2006.01)
  *E02F 9/08* (2006.01)

(52) U.S. Cl.
  CPC .......... *B60L 15/007* (2013.01); *E02F 9/0841* (2013.01); *B60W 2300/17* (2013.01)

(58) Field of Classification Search
  CPC ...... B60K 2007/0069; B60K 2007/003; B60K 2006/4825
  See application file for complete search history.

(56) References Cited

U.S. PATENT DOCUMENTS

| | | | |
|---|---|---|---|
| 8,820,467 B2 * | 9/2014 | Lamoine | H02K 11/33 |
| | | | 180/312 |
| 9,056,557 B2 * | 6/2015 | Kedzierski | B60L 50/64 |
| 9,561,713 B2 * | 2/2017 | Netherland | B60K 1/00 |
| 11,052,741 B2 * | 7/2021 | Ta | B60K 1/04 |
| 11,084,369 B2 * | 8/2021 | Watt | B60K 6/405 |
| 2010/0107812 A1 * | 5/2010 | Otten | B60K 17/04 |
| | | | 29/893.1 |
| 2018/0202548 A1 * | 7/2018 | Rebholz | B60K 17/344 |

FOREIGN PATENT DOCUMENTS

| | | | | |
|---|---|---|---|---|
| DE | 202013011046 U1 * | 4/2015 | | B60K 1/02 |
| DE | 202016101145 U1 | 3/2016 | | |
| DE | 202016102237 U1 | 5/2016 | | |
| DE | 102015102450 A1 * | 8/2016 | | |
| DE | 102016006208 A1 * | 11/2017 | | B60K 1/02 |
| DE | 102019109159 A1 | 10/2020 | | |
| DE | 102019110244 A1 * | 10/2020 | | B60K 1/02 |
| EP | 3936357 A1 * | 1/2022 | | B60K 1/02 |
| KR | 20130040287 A | 4/2013 | | |
| WO | WO 2019160957 A1 | 8/2019 | | |
| WO | WO 2021098970 A1 | 5/2021 | | |
| WO | WO 2021145100 A1 | 7/2021 | | |

* cited by examiner

POWERTRAIN ARRANGEMENT OF A WORK MACHINE AND A WORK MACHINE

CROSS REFERENCE TO RELATED APPLICATIONS

This application is a U.S. National Phase application under 35 U.S.C. § 371 of International Application No. PCT/EP2022/074023, filed on Aug. 30, 2022, and claims benefit to German Patent Application No. DE 10 2021 209 464.3, filed on Aug. 30, 2021. The International Application was published in German on Mar. 9, 2023 as WO 2023/031159 A1 under PCT Article 21(2).

FIELD

The present invention relates to a powertrain arrangement of a working machine and a working machine.

BACKGROUND

In a working machine, such as a wheel loader, the drivetrain usually has an internal combustion engine. This combustion engine also drives the auxiliary drive for a tool, for example to raise and lower a bucket. A basic construction of various working machines driven by an internal combustion engine has been optimized over a long period of time in order to make efficient use of the available installation space, keep costs low and enable efficient work cycles. However, new types of construction machinery are often intended to be electrically driven, for example for climate protection. However, the integration of electric motors may require the reconfiguration of other components of the working machines that have already been optimized.

SUMMARY

In an embodiment, the present disclosure provides a powertrain arrangement of a working machine, comprising a first electric motor, a second electric motor, a frame component, and a transmission, the first electric motor and the second electric motor being connected to the transmission for transmitting torque. The frame component forms a receiving space, in which the first electric motor, the second electric motor and the transmission are accommodated. The frame component has a rear axle casing section, which is configured to rotatably bear a universal-joint shaft connected thereto, the universal-joint shaft connecting the transmission to a rear axle of the working machine. The frame component has a top-side frame section, which is arranged adjacent to a cab floor of the working machine in a vertical direction of the vehicle. The first electric motor and the second electric motor are arranged next to each other in a transverse direction of the vehicle and at least partially at a same level in the vertical direction of the vehicle. The first electric motor and the second electric motor are arranged above the rear axle casing section and below the top-side frame section in the vertical direction of the vehicle.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
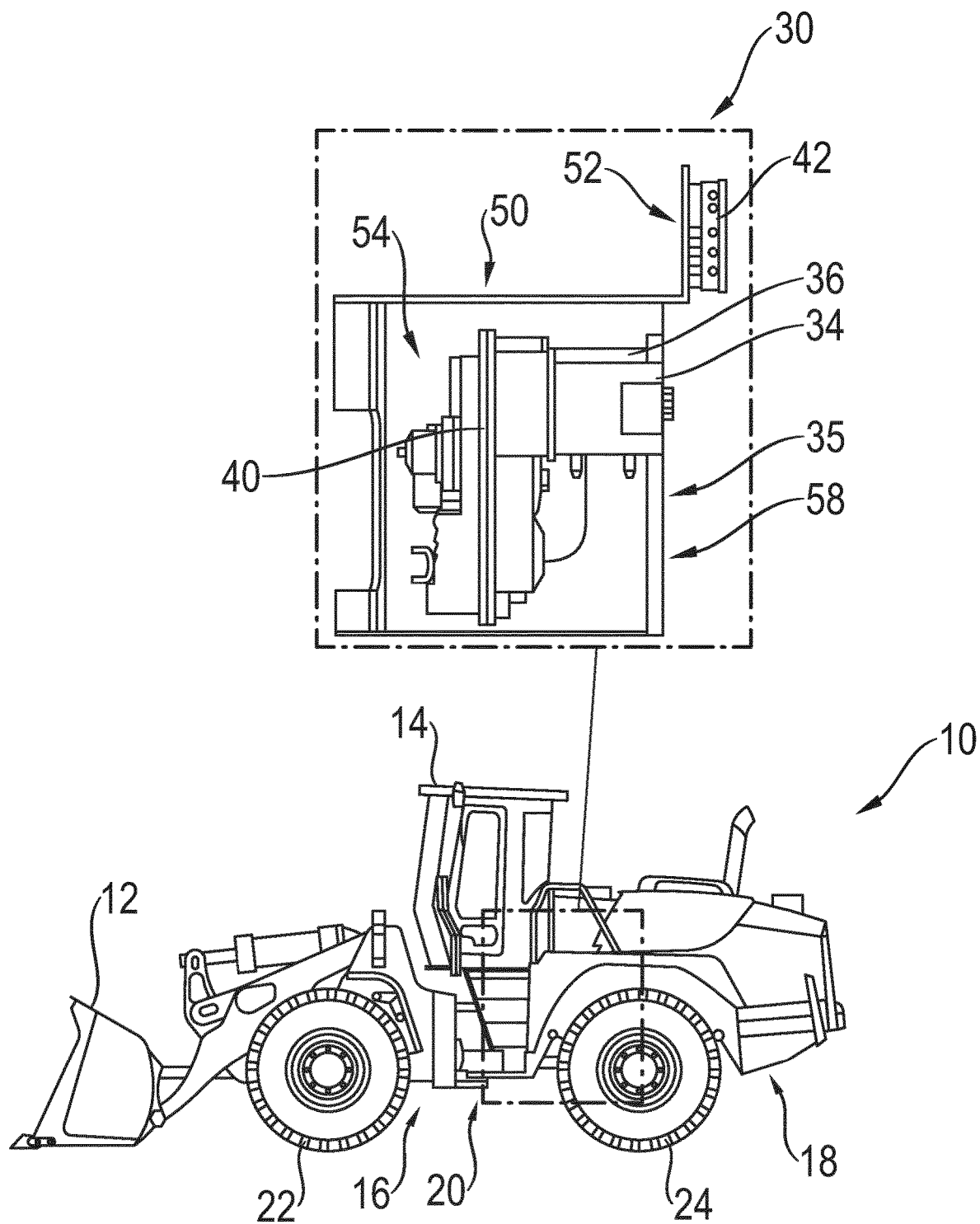
FIG. 1 shows a schematic side view of a working machine with a powertrain arrangement.

A first aspect of the invention relates to a powertrain arrangement of a working machine. The working machine can be configured as a vehicle, for example as a wheel loader or as a grader. A powertrain can, for example, be configured as a drivetrain or as a tool train. Accordingly, the powertrain can be used, for example, to provide a driving power and/or a working power. The powertrain can also provide a drive both for a driving as well as for a tool of the working machine. A tool of a working machine can be a hydraulically operated bucket, for example. The powertrain can be configured to convert electrical power, for example provided by a battery of the working machine, into mechanical power, such as a torque. The powertrain arrangement can, for example, have components of the powertrain and components of a frame of the working machine.

The powertrain arrangement has a first electric motor and a second electric motor as well as a transmission. The powertrain arrangement can also have one or more inverters for supplying power to the respective electric motors. The first electric motor and the second electric motor are connected to the transmission for transmitting torque. The electric motors can be configured as energy converters. An inverter can, for example, convert a direct voltage from a power source of the working machine, such as a battery or a fuel cell, into an alternating voltage or three-phase current. This current can be supplied to the respective electric motor in order to provide a torque. In this way, a traction drive and, alternatively or additionally, an auxiliary drive can be provided, for example for a PTO shaft or a hydraulic pump. The first electric motor can, for example, be configured to provide a torque for driving the working machine. The second electric motor can, for example, be configured to provide a torque for the auxiliary drive of the working machine. For example, a bucket of the working machine can be driven by the second electric motor in order to move it. For example, the two electric motors can be attached to the transmission. Each electric motor can be connected with its driven shaft to a corresponding drive shaft of the transmission. The transmission can have a corresponding driven shaft for each electric motor connected to it. In this way, the torque of each electric motor can be transmitted separately from the transmission to different consumers.

The transmission can be configured as a multi-speed transmission. The transmission can, for example, be configured to provide mechanical power generated by the respective electric motor to a consumer, such as a traction drive or a tool.

The powertrain arrangement has a frame component. The frame component can be formed from several elements, for example. The frame component can be made of metal. These elements can be formed as plates, for example. Respective elements of the frame component can, for example, be welded together, screwed or otherwise connected to each other. The frame component can have a solid configuration. The frame component can be configured as a structural component of the working machine. A wheel loader can have a front carriage and a rear carriage, which are connected to each other by means of an articulated joint. The rear carriage can, for example, have the frame component. The frame component can be configured to be connected to an articulated joint of the working machine at the front of the frame component. The working machine can have a steering device, which is configured to enable steering of the working machine when driving by pivoting a front axle to a rear axle about a vertical axis. The steering system can, for example, have the articulated joint and respective steering cylinders, which are connected to the frame component.

The frame component forms a receiving space, in which the first electric motor, the second electric motor and the transmission are accommodated. The receiving space can be an interior space of the frame component, which is at least partially delimited by the latter. The frame component can at least partially enclose the first electric motor, the second electric motor and the transmission. The first electric motor, the second electric motor and the transmission can be arranged in the receiving space in such a way that they do not protrude from the frame component. The first electric motor, the second electric motor and, alternatively or additionally, the transmission can be attached to the frame component, for example by means of screw connections.

The frame component has a rear axle casing section. The rear axle casing section is configured to rotatably bear a universal-joint shaft on it, which connects the transmission to a rear axle of the working machine. The rear axle of the working machine can run in the transverse direction of the vehicle, for example when the working machine is traveling straight ahead or in the transverse direction of the rear carriage. Wheels of the working machine can be mounted at both sides of the rear axle. The rear axle can be configured as a driven axle. The universal-joint shaft can be configured as a cardan shaft, for example. The universal-joint shaft can, for example, be mounted on the rear axle casing section by means of a flange. The rear axle casing section can extend above the universal-joint shaft in the vertical direction of the vehicle. The rear axle casing section can be curved at least in some areas. The universal-joint shaft can be connected to a driven shaft of the transmission. The rear axle casing section can be arranged at a rear side of the frame component and can form part of the rear side. The rear axle casing section can delimit the receiving space in the longitudinal direction of the vehicle to the rear. The rear side can refer to a longitudinal direction of the vehicle and alternatively or additionally to a forward driving direction of the working machine. The longitudinal direction of the vehicle can correspond to a longitudinal direction of the rear carriage or even the entire working machine, for example when driving straight ahead. A wheel loader has a bucket at the front, for example.

Respective directions can be related to an installation position, for example of the frame component. For example, respective driven shafts of the transmission can define its installation position in the working machine. The installation position of the electric motors can be predetermined by their connection to the transmission.

The frame component has a top-side frame section. The frame section can be formed by a plate, for example, which forms the upper side of the frame component. The upper side and the top-side can refer to the vehicle's vertical direction. The top-side frame section can be arranged adjacent to a cab floor of the working machine in the vertical direction of the vehicle. The top-side frame section can at least partially form the cab floor of the working machine with its upper side. This allows the cab floor to be at least partially formed by the frame component in a cost-saving manner. The upper side of the top-side frame section can be a surface facing in the vertical direction of the vehicle and, alternatively or additionally, a surface facing away from the receiving space. The top-side frame section can delimit the receiving space upwards in the vertical direction of the vehicle.

The first electric motor and the second electric motor are arranged next to each other in the transverse direction of the vehicle and at least partially at a same level in the vertical direction of the vehicle. An extent of the two electric motors in the vehicle's vertical direction can therefore, for example, at least partially overlap. The level can be a position in the vehicle's vertical direction. Next to each other can mean that an extent of the two electric motors also overlaps at least partially in the longitudinal direction of the vehicle. This arrangement of the two electric motors allows a compact powertrain arrangement.

The first electric motor and the second electric motor are arranged above the rear axle casing section and below the top-side frame section in the vehicle's vertical direction. Above the rear axle casing section can mean that the rear axle casing section extends in the vertical direction of the vehicle only up to a level that is below a lower edge of the first electric motor and the second electric motor. Below the top-side frame section can mean that the first electric motor and the second electric motor only extend to a level that is below a lower edge of the top-side frame section. This arrangement of the two electric motors means that they are particularly easily accessible and can be easily arranged in the receiving space.

The powertrain arrangement allows an improved integration of an electrically operated powertrain into a working machine otherwise configured for a drive with an internal combustion engine. For example, a rear axle, an articulated joint, an auxiliary drive, other frame components, a front end and respective steering cylinders can remain unchanged as assembly group. The powertrain can still be installed with little effort and without restricting other installation space. This means that existing machines, such as wheel loaders, can be equipped with new electric drive systems without the need for alternative extensive modifications. Respective components of the powertrain can be arranged in such a way that their installation assembly, their connection to other components and their maintenance are associated with little effort.

In an embodiment of the powertrain arrangement it is provided that the frame component has a first side section, a second side section and a front section. The two side sections can delimit the receiving space in the transverse direction of the vehicle. The front section can delimit the receiving space forwards in the longitudinal direction of the vehicle. The front section can be configured to be connected to the articulated joint of the working machine. The frame component can thus well protect the components accommodated in the receiving space from damage.

The first side section can be arranged at an end section of the rear axle casing section. The second side section can be arranged at an end section of the rear axle casing section opposite to it in the transverse direction of the vehicle. The rear axle casing section can be arranged at an end section of the first side section and of the second side section, for example at the rear. The front section can be arranged at an end section of the first side section and the second side section opposite to it in the longitudinal direction of the vehicle, i.e. for example at a front end section in each case. The frame component can thus have a construction that is easy to manufacture.

The side sections can, for example, be configured as flat elements that extend in the longitudinal direction of the vehicle and in the vertical direction of the vehicle. The side sections can be arranged parallel to each other and, alternatively or additionally, can be formed identically or mirrored to each other. The rear axle casing section can, for example, be configured as a flat element that extends in the transverse direction of the vehicle and in the vertical direction of the vehicle. The top-side frame section can, for example, be configured as a flat element that extends in the longitudinal direction of the vehicle and in the transverse direction of the vehicle. The front section can, for example, be configured as a flat element that extends in the transverse direction of the vehicle and in the longitudinal direction of the vehicle. The front section can, for example, be arranged parallel to the rear axle casing section. The frame component can also have a floor section, which is arranged between the components extending in the vertical direction of the vehicle below the receiving space. The floor section can delimit the receiving space at the lower side. The floor section can be configured as a flat element. The respective flat elements can be firmly connected to each other, for example by means of a welding. The welding can, for example, be carried out along an outer edge of at least one of the flat elements. Several or all flat elements can also be formed in one piece. The flat elements can be formed as plates, for example as steel plates. The respective sections can delimit the receiving space of the frame component.

In an embodiment of the powertrain arrangement, it is provided that the first electric motor and the second electric motor are arranged at the rear side of the transmission in the longitudinal direction of the vehicle. This allows the two electric motors to be arranged particularly close to the respective inverters and, alternatively or additionally, to a power source of the working machine, such as a battery. This means that the distance for electrically connecting the two electric motors can be short and the electrical connection can be simplified. The power source of the working machine can, for example, be arranged at the rear side of the frame component in the longitudinal direction of the vehicle.

In an embodiment of the powertrain arrangement, it is provided that the frame component has a through-opening at the rear between a lower edge of the first and the second electric motor and an upper edge of the first and the second electric motor. The through-opening can be an area, in which the receiving space is not closed off. The through-opening at the rear makes it easy to connect the electric motors electrically and to maintain them, for example if the electric motors are arranged at the rear side of the transmission. The upper edge can be an upper end of one of the two electric motors. The lower edge can be a lower end of one of the two electric motors. For example, the frame component can have the through-opening between an upper end of the rear axle casing section and below the top-side frame section. The through-opening can allow an easy insertion of the two electric motors into the receiving space and also an easy removal. The two electric motors can also be easily connected in this way.

In an embodiment of the powertrain arrangement, it is provided that the first electric motor has a first terminal box with an electrical connection. The second electric motor can have a second terminal box with an electrical connection. The numbering can thereby serve only as identification of the respective electric motor. The second electric motor can therefore only have one terminal box, for example. A terminal box can have electrical connections for current supply and, alternatively or additionally, for control or monitoring. The first terminal box with its electrical connection can point to the rear in the longitudinal direction of the vehicle. The second terminal box with its electrical connection can point to the rear in the longitudinal direction of the vehicle. As a result, an electrical connection of the electric motors with the respective inverters and, alternatively or additionally, with the current sources of the working machine can be short.

In an embodiment of the powertrain arrangement, it is provided that the powertrain arrangement has a first inverter and a second inverter. The first inverter can be configured to supply the first electric motor with electrical power. The second inverter can be configured to supply the second electric motor with electrical power. The electrical power can be provided by the inverters, for example, by means of an alternating current. The first inverter can, for example, be electrically connected to the first terminal box. The second inverter can, for example, be electrically connected to the second terminal box.

The first inverter and the second inverter can be arranged behind the frame component in the longitudinal direction of the vehicle. This can result in an arrangement in the longitudinal direction of the vehicle between the current source of the working machine and the electric motors. Accordingly, the respective electrical lines can be short and losses can be small. As a result, the powertrain can be very efficient. The two inverters can be attached to the frame component, for example. The two inverters can, for example, be attached to a side of the frame component facing away from the receiving space. The two inverters can also have a charging device for a power source of the working machine and, alternatively or additionally, a DC-DC converter. A charging device and, alternatively or additionally, a DC-DC converter can also be positioned adjacent to the inverters, for example with attachment to the inverters and, alternatively or additionally, to the frame component.

Alternatively, one or both inverters can be arranged next to the transmission in the transverse or vertical direction of the vehicle. For example, the inverters can be attached at their lower sides to the top-side frame section. Alternatively, the two inverters can also be attached at the outside or inside of the side sections, for example one inverter per side section.

In an embodiment of the powertrain arrangement, it is provided that the frame component has an inverter attachment section. The respective inverters can be attached to the inverter attachment section, for example by means of a screw connection or a bonding. The first inverter and the second inverter can be attached at their rear side to the inverter attachment section. The inverter attachment section can be configured as a flat element. The inverter attachment section can, for example, not delimit the receiving space, but instead, for example, be arranged at a distance from it. For example, the inverter attachment section can protrude from a section delimiting the receiving space. The inverter attachment section can extend upwards in the vehicle's vertical direction from a rear end section of the top-side frame section. This allows the inverters to be attached in such a way that they do not restrict accessibility to the two electric motors. In addition, the inverter attachment section cannot obstruct the arrangement of the universal-joint shaft, for example. The inverter attachment section can be arranged adjacent to a rear wall of the cab of the working machine. For example, the inverter attachment section can form the rear wall of the cab at least partially with its front side. For example, the inverters can be attached to a lower end region of the rear wall of the cab and thus of the inverter attachment section. Thus the rear wall of the cab can be formed at least partially by the frame component in a cost-saving manner.

In an embodiment of the powertrain arrangement, it is provided that the first inverter and the second inverter are configured together as a double inverter. A double inverter can, for example, be configured to supply two electric motors separately with electrical power. A double inverter can, for example, only have one housing. A double inverter can, for example, only have one connection for electrically connecting to the current source of the working machine. A double inverter can, for example, only have one cooling connection. A double inverter can, for example, only have one CAN-connection. Providing the double inverter can make it particularly easy to integrate this. For example, the two inverters can thus simply be attached and connected together to the inverter attachment section. The double inverter can have a connection for the power supply of the first electric motor and a connection for the power supply of the second electric motor.

In an embodiment of the powertrain arrangement, it is provided that the frame component has a connection attachment section. The connection attachment section can have at least one feed-through for an interface of the powertrain of the working machine. The feed-through can be configured as a through-opening. The feed-through can be adapted to a cross-section of the interface. The connection attachment section allows the respective interfaces to be securely arranged on the frame component. The connection attachment section can extend downwards from a rear end area of the top-side frame section. This allows the respective interfaces to be held securely in or on the receiving space. This also prevents the interfaces from occupying an installation space for the electric motors or from being arranged loosely in the receiving space.

In an embodiment of the powertrain arrangement, it is provided that the transmission has a driven shaft for an auxiliary drive of the working machine. The driven shaft for the auxiliary drive can be arranged in a central area in the vehicle direction. For example, the driven shaft for the auxiliary drive can be arranged as close as possible in the transverse direction of the vehicle to a driven shaft of the transmission for a rear axle and, alternatively or additionally, to a driven shaft of the transmission for a front axle. This ensures clearance to a tapered articulated joint in the direction of the front carriage. The driven shaft for the auxiliary drive can be arranged at the front side of the transmission, for example. The driven shaft for the rear axle can be arranged on a rear side of the transmission, for example. The driven shaft for the front axle can, for example, be arranged on a front side of the transmission. The driven shaft for the front axle can be arranged below the driven shaft for the auxiliary drive. The frame component can be tapered at the front, for example in a top view from above.

A second aspect of the invention relates to a working machine. The working machine has a powertrain arrangement according to the first aspect. Respective further characteristics, embodiments and advantages can be found in the descriptions of the first aspect. In addition, the working machine has a driver's cab, a universal-joint shaft and a rear axle connected to the universal-joint shaft. The universal-joint shaft is configured to transmit a torque from the transmission to the rear axle. The universal-joint shaft is rotatably mounted on the rear axle casing section, for example by means of a flange. The top-side frame section is arranged adjacent to the cab floor of the working machine in the vertical direction of the vehicle. The top-side frame section can form part of the cab floor. The working machine can have a front carriage. The frame component can be pivotably connected to the front carriage about a vertical axis by means of an articulated joint.

In an embodiment of the working machine, it is provided that the working machine has a steering cylinder that is attached to the frame component at one end. With an opposite end, the steering cylinder can be attached to the front carriage. The working machine can have a pair of steering cylinders, with one steering cylinder being arranged at one side of the articulated joint.

In a height range that overlaps with the attachment of the steering cylinder to the frame component, the transmission can have a smaller extent in the transverse direction of the vehicle than in another height range. An extent in the transverse direction of the vehicle can be a width. A height range can be an extent in a certain area in the vehicle's vertical direction. For example, the transmission can be wider in a height range that is connected to the electric motors than in this height range. For example, the height range that overlaps with the attachment of the steering cylinder to the frame component can be a height range of the transmission with the smallest extent in the transverse direction of the vehicle. This allows the transmission to be easily integrated despite the steering cylinders. For example, in the area of the steering cylinders, the transmission can correspond to the outer contour of a transmission for a similar working machine with an internal combustion engine.

In an embodiment of the working machine, it is provided that the working machine has a power source that is arranged behind the frame component in the longitudinal direction of the vehicle. This makes it easy to electrically connect the respective components of the powertrain for the supply of electrical power. The power source can be rechargeable. The power source can be the current source of the working machine. Alternatively or additionally, the power source can be arranged above the top-side frame section.

The working machine can have a tool. The tool can be operated hydraulically, for example, with the auxiliary drive driving a hydraulic pump. The tool can be arranged in front of the frame component in the longitudinal direction of the vehicle, for example at a front side of the front carriage.

FIG. 1 shows a schematic side view of a working machine 10 configured as a wheel loader according to the prior art. The working machine 10 has an excavator bucket 12 as a tool, which is movably arranged at a front side of a front carriage 16 of the working machine 10. The front carriage 16 is connected at the rear to a front side of a rear carriage 18 by means of an articulated joint 20. The working machine 10 has a longitudinal vehicle direction, which runs straight through the front carriage 16 and the rear carriage 18 when the articulated joint 20 is in a straight-ahead driving position. In addition, the working machine 10 has a driver's cab 14, which is arranged above the articulated joint 20 in the vertical direction of the vehicle. The front carriage 16 has a front axle with respective wheels 22. The rear carriage 18 has a rear axle with respective wheels 24. The two axles extend in the transverse direction of the vehicle when the articulated joint 20 is in the straight-ahead position.

The working machine 10 was originally configured to be driven by an internal combustion engine. Now, however, an electrically operated powertrain arrangement 30 is provided. The powertrain arrangement 30 is shown separately and partially sectioned above the working machine 10, with the box 32 illustrating its position in the working machine 10.

The powertrain arrangement 30 has a first electric motor 34, a second electric motor 36, a frame component 38, a transmission 40 and a double inverter 42. Both electric motors 34, 36 are attached to the rear of the transmission 40 in the longitudinal direction of the vehicle. During operation, the transmission 40 transmits a torque provided by the first electric motor 34 from a first driven shaft to the rear axle via a universal-joint shaft. During operation, the transmission 40 transmits a torque provided by the second electric motor 36 from a second driven shaft to an auxiliary drive. The auxiliary drive is used to pressurize a hydraulic system of the bucket 12 so that it can be actuated. The double inverter 42 forms a first inverter for supplying the first electric motor 34 with electrical power and a second inverter for supplying the first electric motor 36 with electrical power.

The frame component 38 forms a receiving space, in which the first electric motor 34, the second electric motor 36 and the transmission 40 are accommodated. As can be seen in the various views of the powertrain arrangement 30, none of these components of the powertrain arrangement 30 protrude outwards. A current source for the powertrain in the form of a battery or a fuel cell is arranged at the rear of the powertrain arrangement 30 in the longitudinal direction of the vehicle. The first electric motor 34 and the second electric motor 36 are arranged next to each other in the transverse direction of the vehicle and at least partially at the same level in the vertical direction of the vehicle.

The frame component 38 has a top-side frame section 50, which delimits the receiving space upwards in the vertical direction of the vehicle and which partially forms a floor of the driver's cab 14. An inverter attachment section 52 extends upwards in the vertical direction of the vehicle from a rear end section of the top-side frame section 50. The inverter attachment section 52 partially forms a rear cab wall of the driver's cab 14. At the rear side, the double inverter 42 is attached to the inverter attachment section 52 outside the receiving space.

Towards the front in the transverse direction of the vehicle, the receiving space is delimited by two side sections 54 of the frame component 38, which extend parallel to each other in the longitudinal direction of the vehicle. A front side of the receiving space is delimited by a front section 56 of the frame component. As can be seen in the top view of FIG. 5, the front section 56 is essentially V-shaped in order to provide a free space for pivoting the front carriage 16 relative to the rear carriage 18 about the articulated joint 20. The front section 56 extends between the two side sections 54 at their front end section.

Figure 2:
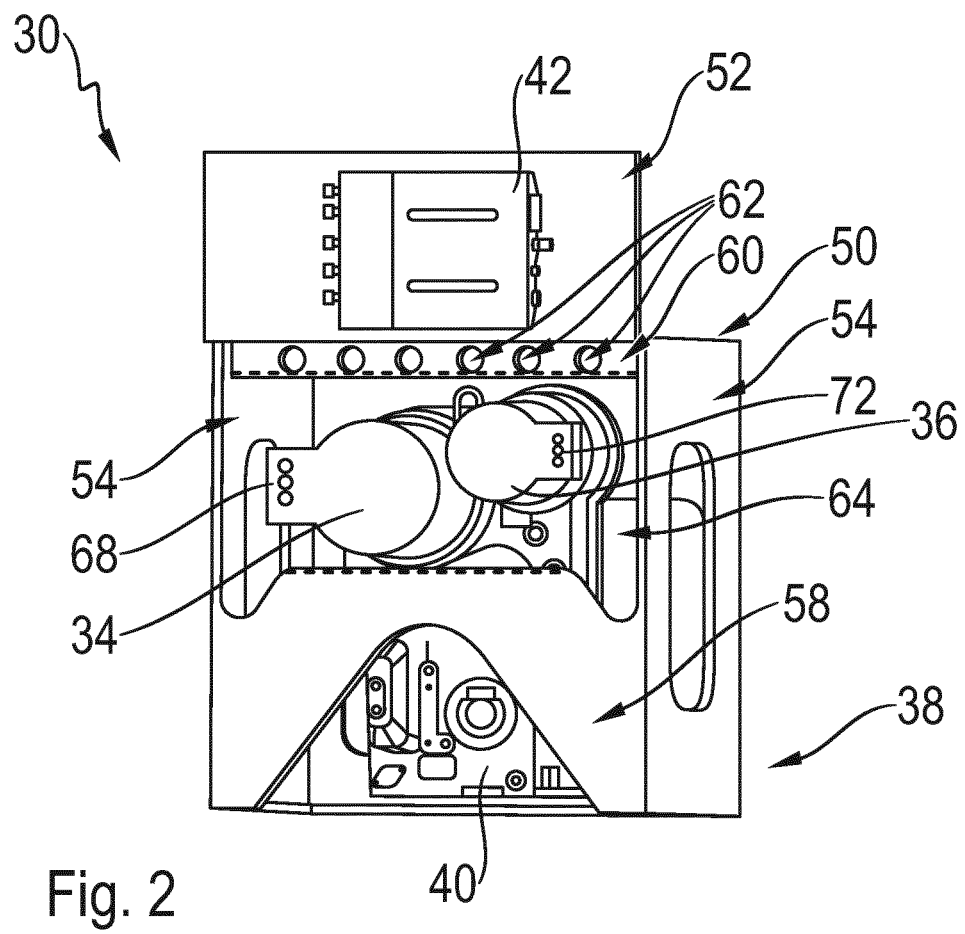
FIG. 2 shows a schematic rear-side perspective view of the powertrain arrangement of the working machine as shown in FIG. 1.

The frame component 38 has a rear axle casing section 58, which extends between the two side sections 54 at their rear end sections. The rear axle casing section 58 delimits the receiving space towards the rear in the longitudinal direction of the vehicle. The universal-joint shaft for torque transmission to the rear axle is mounted on a lower edge of the rear axle casing section 58 by means of a flange. As can be seen in the rear-side perspective view according to FIG. 2, the rear axle casing section 58 is curved at its lower edge. Thereby a through-opening is provided at a lower end of the receiving space, through which the universal-joint shaft runs. The rear of the universal-joint shaft is connected to the transmission 40.

Figure 3:
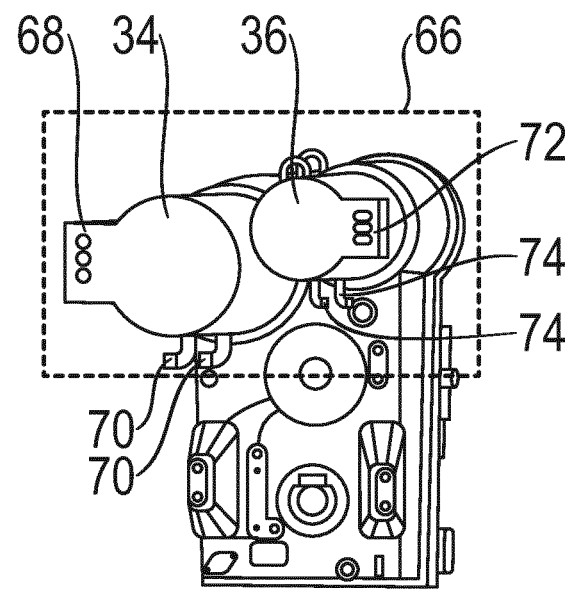
FIG. 3 shows a schematic rear-side perspective view of components of the powertrain arrangement as shown in FIG. 2.

The frame component 38 has a further through-opening 64 between an upper edge of the rear axle casing section 58 and a lower edge of the connection attachment section 60. The connection attachment section 60 extends downwards from a rear end section of the top-side frame section 50 in the vehicle vertical direction and has a plurality of feed-throughs 62 arranged next to one another in the vehicle transverse direction, through which interfaces of the powertrain of the working machine 10 are guided into and/or out of the receiving space. As can be seen by comparing FIG. 3 and FIG. 2 (see box 66), the through-opening 64 extends at least from a lower edge of the first electric motor 34 and the second electric motor 36 to an upper edge of the first electric motor 34 and the second electric motor 36 at the rear side of the frame component. The through-opening 64 is also at least as wide as the two electric motors 34, 36 in the transverse direction of the vehicle. The first electric motor 34 and the second electric motor 36 are arranged above the rear axle casing section 58 and below the top-side frame section 50 and also below the connection attachment section 60 in the vertical direction of the vehicle. As a result, the electric motors 34, 36 are freely accessible in order to connect them.

The first electric motor 34 has a first terminal box 68 for being supplied with electrical power and two connections 70 for a cooling. The second electric motor 36 has a second terminal box 72 for being supplied with electrical power and two connections 74 for a cooling. The first terminal box 68 and the second terminal box 72 with their respective electrical connection point to the rear in the longitudinal direction of the vehicle. The two terminal boxes 68, 72 and the connections 70, 74 for the cooling are easily accessible for connecting in the area of the through-opening 64 from the rear of the powertrain arrangement. The double inverter 42 is arranged adjacent to the two terminal boxes 68, 72 and to the current source, so that the respective power lines are short and thus losses are low.

Figure 5:
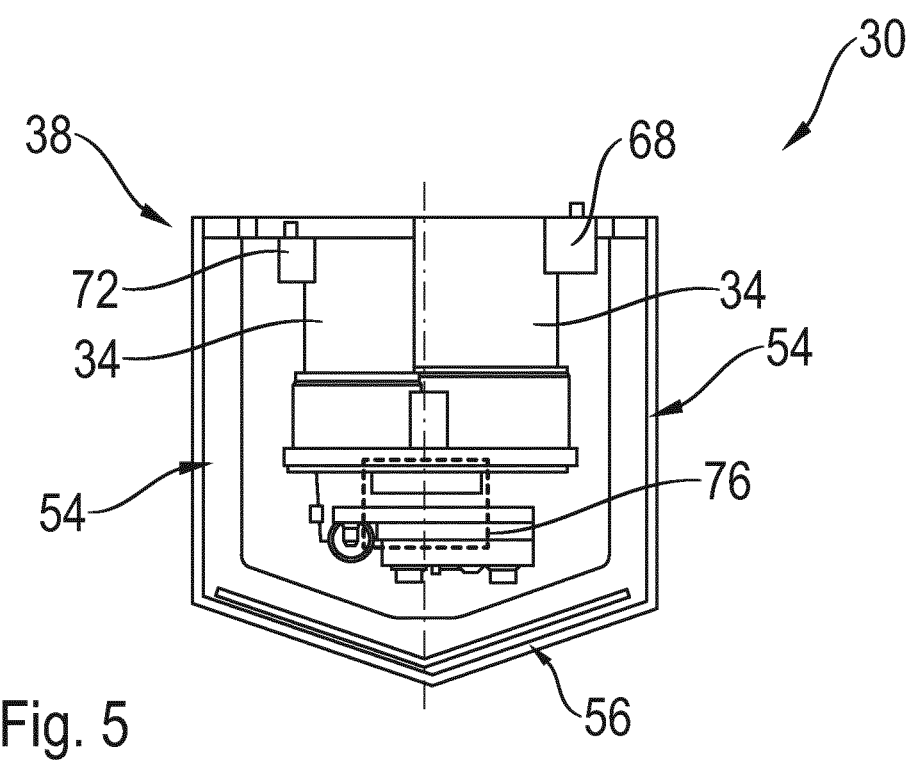
FIG. 5 shows a schematic top view of the powertrain arrangement according to FIG. 2.

In the top view according to FIG. 5, a connection area of an auxiliary drive to the corresponding driven shaft of the transmission 40 is illustrated with a box 76, for which the frame component 38 is shown partially sectioned. This connection area and thus also this driven shaft of the transmission 40 is arranged in a central area in the transverse direction of the vehicle. Thus free space for steering by means of the articulated joint 20 is provided and also a connection of the auxiliary drive to the transmission 40 is facilitated.

Figure 4:
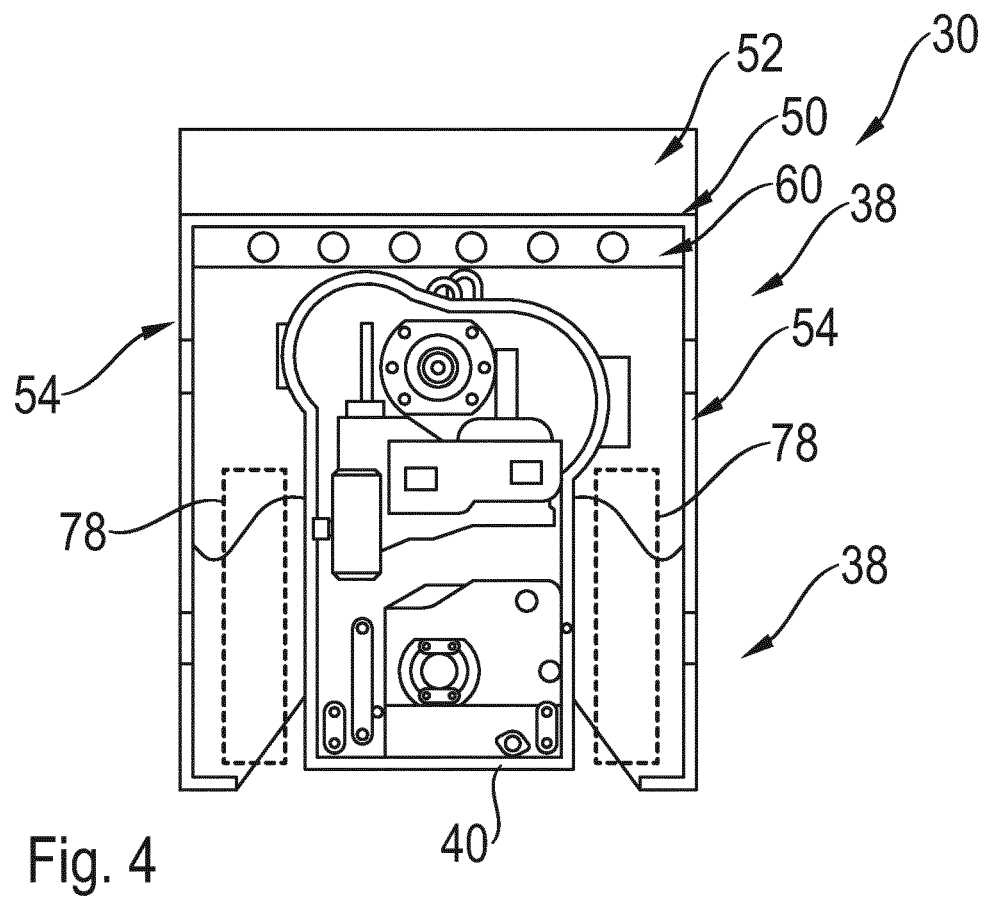
FIG. 4 shows a schematic front view of the powertrain arrangement as shown in FIG. 2.

In the front view according to FIG. 4, the frame component 38 is also shown partially sectioned in order to illustrate a left and a right connection area for respective steering cylinders of the working machine 10 with box 78. There, the two steering cylinders of the working machine are attached at one end to the frame component 38 and thus to the rear carriage 18. At an opposite end, the two steering cylinders are attached to the front carriage 16. In a height range, which overlaps with the attachment of the steering cylinder to the frame component 38, as illustrated by boxes 78, the transmission 40 has a smaller extent in the transverse direction of the vehicle than in another height range. This provides plenty of free space for the steering cylinders. The transmission 40 is narrowest in this area. In the vertical direction of the vehicle above, the transmission 40 is wider in the area of the two electric motors 34, 36.

The powertrain arrangement 30 allows the working machine 10 to be equipped with an electrically operated powertrain without any further major design changes.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMBERS 10 working machine
12 excavator bucket
14 driver's cab
16 front carriage
18 rear carriage
20 articulated joint
22 front axle with wheels
24 rear axle with wheels
30 powertrain arrangement
32 position of the powertrain arrangement
34, 36 electric motors
38 frame component
40 transmission
42 double inverter
50 top-side frame section
52 inverter attachment section
54 side sections
56 front section
58 rear axle casing section
60 connection attachment section
62 lead-throughs
64 through-opening
66 marking of an alignment of electric motors to through-opening
68, 72 terminal box
70, 74 connections
76 connection area of an auxiliary drive
78 connection area for steering cylinder

The invention claimed is:

1. A powertrain arrangement of a working machine, comprising:

a first electric motor;
a second electric motor;
a frame component; and
a transmission, the first electric motor and the second electric motor being connected to the transmission for transmitting torque,
wherein the frame component forms a receiving space, in which the first electric motor, the second electric motor and the transmission are accommodated,
wherein the frame component has a rear axle casing section, which is configured to rotatably bear a universal-joint shaft connected thereto, the universal-joint shaft connecting the transmission to a rear axle of the working machine,
wherein the frame component has a top-side frame section, which is arranged adjacent to a cab floor of the working machine in a vertical direction of the vehicle,
wherein the first electric motor and the second electric motor are arranged next to each other in a transverse direction of the vehicle and at least partially at a same level in the vertical direction of the vehicle, and
wherein the first electric motor and the second electric motor are arranged above the rear axle casing section and below the top-side frame section in the vertical direction of the vehicle.

2. The powertrain arrangement according to claim 1, wherein the frame component has a first side section, a second side section and a front section,
wherein the first side section is arranged at an end section of the rear axle casing section,
wherein the second side section is arranged at an opposite end section of the rear axle casing section in the transverse direction of the vehicle,
wherein the rear axle casing section is arranged at an end section of the first side section and the second side section, and
wherein the front section is arranged at an opposite end section of the first side section and the second side section in a longitudinal direction of the vehicle.

3. The powertrain arrangement according to claim 2, wherein the first electric motor and the second electric motor are arranged at a rear side of the transmission in the longitudinal direction of the vehicle.

4. The powertrain arrangement according to claim 1, wherein the frame component has a rear-side through-opening between a lower edge of the first electric motor and of the second electric motor and an upper edge of the first electric motor and of the second electric motor.

5. The powertrain arrangement according to claim 1, wherein the first electric motor has a first terminal box with an electrical connection and the second electric motor has a second terminal box with an electrical connection, the first terminal box with its electrical connection pointing to a rear in the longitudinal direction of the vehicle and the second terminal box with its electrical connection pointing to the rear in the longitudinal direction of the vehicle.

6. The powertrain arrangement according to claim 1, wherein the powertrain arrangement has a first inverter and a second inverter, the first inverter being configured to supply the first electric motor with electrical power, the second inverter being configured to supply the second electric motor with electrical power, and the first inverter and the second inverter being arranged behind the frame component in the longitudinal direction of the vehicle.

7. The powertrain arrangement according to claim 6, wherein the frame component has an inverter attachment section, to which the first inverter and the second inverter are attached at the rear side and which extends upwards in the vertical direction from a rear end section of the top-side frame section in the vertical direction and which is arranged adjacent to a cab rear wall of the working machine.

8. The powertrain arrangement according to claim 6, wherein the first inverter and the second inverter are configured together as a double inverter.

9. The powertrain arrangement according to claim 1, wherein the frame component has a connection attachment section, which extends downwards from a rear end region of the top-side frame section and which has at least one feed-through for an interface of the powertrain of the working machine.

10. The powertrain arrangement according to claim 1, wherein the transmission has a driven shaft for an auxiliary drive of the working machine, which is arranged in a central region in the transverse direction of the vehicle.

11. A working machine, comprising:
the powertrain arrangement according to claim 1;
a driver's cab;
a universal-drive shaft; and
a rear axle connected to the universal-drive shaft,
wherein the universal-drive shaft is rotatably mounted on the rear axle casing section and the top-side frame section is arranged adjacent to the cab floor of the working machine in the vertical direction of the vehicle.

12. The working machine according to claim 11, wherein the working machine has a steering cylinder, which at one end is attached to the frame component, the transmission having a smaller extent in the transverse direction of the vehicle in a height range that overlaps with the attachment of the steering cylinder to the frame component than in another height range.

13. The working machine according to claim 11, wherein the working machine has a power source, which is arranged behind the frame component in a longitudinal direction of the vehicle.

* * * * *